US012572899B2

(12) United States Patent
Gao et al.

(10) Patent No.: US 12,572,899 B2
(45) Date of Patent: Mar. 10, 2026

(54) SYSTEM AND METHODS FOR GENERATING TASKS BASED ON AGENT PROFILES

(71) Applicant: STATE FARM MUTUAL AUTOMOBILE INSURANCE COMPANY, Bloomington, IL (US)

(72) Inventors: Helena Gao, Naperville, IL (US); Siddhartha Adatrao, Hawthorn Woods, IL (US); Shresta Bangaru, Herndon, VA (US); Alyxandra Merritt, Bloomington, IL (US); Aarya Barve, West Lafayette, IN (US); Gary L. Ward, Mackinaw, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 987 days.

(21) Appl. No.: 17/226,369

(22) Filed: Apr. 9, 2021

(65) Prior Publication Data

US 2022/0198299 A1    Jun. 23, 2022

Related U.S. Application Data

(60) Provisional application No. 63/064,881, filed on Aug. 12, 2020.

(51) Int. Cl.
*G06Q 50/00*        (2024.01)
*G06N 3/006*        (2023.01)
(Continued)

(52) U.S. Cl.
CPC ............. *G06Q 50/01* (2013.01); *G06N 3/006* (2013.01); *G06N 5/04* (2013.01); *G06N 20/00* (2019.01); *G06N 20/20* (2019.01)

(58) Field of Classification Search
CPC ........ G06Q 50/01; G06N 20/20; G06N 20/00; G06N 5/04; G06N 3/006
See application file for complete search history.

(56) References Cited

U.S. PATENT DOCUMENTS 9,397,974 B1 *   7/2016   Gross ...................... H04L 51/52
10,684,738 B1 *   6/2020   Sicora ................... G06F 3/0485
(Continued)

OTHER PUBLICATIONS

Osman et al., "Influencer Tools for Stream Curation Based on Follower Information" Jul. 16, 2020, U.S. Appl. No. 63/052,903, pp. 1-60. (Year: 2020).*

(Continued)

*Primary Examiner* — Miranda M Huang
*Assistant Examiner* — Chase P. Hinckley
(74) *Attorney, Agent, or Firm* — MARSHALL, GERSTEIN & BORUN LLP

(57)        ABSTRACT

Techniques and devices for enhancing media content and presence are discussed herein. An example technique may include aggregating social media data from a plurality of agent profiles and determining a composite score corresponding to each respective agent profile by applying a media enhancement model to the social media data. The example technique may further include cataloging each respective agent profile into an agent profile group of a plurality of agent profile groups based upon the composite score corresponding to the respective agent profile, and determining one or more top media posts by applying the media enhancement model to the plurality of agent profile groups and the social media data. The example technique may further include displaying the one or more top media posts on a virtual social media board for viewing by a respective agent associated with each respective agent profile.

20 Claims, 5 Drawing Sheets

400

| | Likes 23% | Followers 94% | Followers Change 72% | Overall 54% |

402    404

Y

My Social Media Tasks
Here is a list of all your social media tasks based on your social media use right now. Use the tabs to view completed or incomplete. Click on a task to view more information. Use the checkboxes to mark tasks as complete/incomplete.

Suggest a Task/Tip
Enter a new task/tip idea

406

Filter ▽    408a    408b
410    Incomplete Tasks    Complete Tasks

Your need to increase your engagement in posts. Try to make more personal posts such as asking your users to engage. Points: 0

(51) Int. Cl.

| | |
|---|---|
| *G06N 5/04* | (2023.01) |
| *G06N 20/00* | (2019.01) |
| *G06N 20/20* | (2019.01) |

(56) References Cited

U.S. PATENT DOCUMENTS

| | | | | |
|---|---|---|---|---|
| 2013/0197970 A1* | 8/2013 | Aaskov | | G06Q 50/01 705/7.31 |
| 2013/0262188 A1* | 10/2013 | Leibner | | G06Q 30/02 705/26.1 |
| 2014/0207579 A1* | 7/2014 | LeBrun | | G06Q 30/0269 705/14.66 |
| 2014/0244759 A1* | 8/2014 | Smith | | H04L 67/306 709/204 |
| 2014/0280222 A1* | 9/2014 | Braytenbaum | ... | G06F 16/24578 707/748 |
| 2015/0371257 A1* | 12/2015 | Peters | | G06Q 30/0249 705/14.43 |
| 2017/0148062 A1* | 5/2017 | Berk | | G06Q 30/0267 |
| 2018/0204243 A1* | 7/2018 | Haaland | | G06Q 30/0251 |
| 2019/0121916 A1* | 4/2019 | Bennun | | G06F 16/9535 |
| 2019/0122162 A1* | 4/2019 | Abhinav | | G06Q 10/063118 |
| 2020/0007934 A1* | 1/2020 | Ortiz | | H04N 21/25883 |
| 2020/0294108 A1* | 9/2020 | Perry | | G06N 20/00 |
| 2021/0241163 A1* | 8/2021 | Witztum | | G06F 16/285 |
| 2021/0248687 A1* | 8/2021 | Albert | | H04L 67/306 |
| 2021/0406964 A1* | 12/2021 | Copeland | | G06N 20/00 |
| 2022/0012296 A1* | 1/2022 | Marey | | G06N 20/00 |
| 2022/0021933 A1* | 1/2022 | Osman | | G06Q 50/01 |
| 2023/0334103 A1* | 10/2023 | Underwood | | G06F 16/958 |

OTHER PUBLICATIONS

Bi et al., "A Heterogeneous Information Network based Cross Domain Insurance Recommendation System for Cold Start Users" Jul. 30, 2020, arXiv: 2007.15293v1, pp. 1-11. (Year: 2020).*

Wang et al., "Joint Topic-Semantic-aware Social Recommendation for Online Voting" Nov. 2017, pp. 347-356. (Year: 2017).*

Wu et al., "Mining Unfollow Behavior in Large-Scale Online Social Networks via Spatial-Temporal Interaction" Nov. 17, 2019, arXiv: 1911.07156v1, pp. 1-8. (Year: 2019).*

Yang et al., "Collaborative Filtering-Based Recommendation of Online Social Voting" Mar. 2017, pp. 1-13. (Year: 2017).*

Zhao et al., "Jointly Learning to Recommend and Advertise" Jun. 19, 2020, arXiv: 2003.00097v2, pp. 1-9. (Year: 2020).*

Vaghani, Kushal, "Curating Social Media Data" Feb. 21, 2020, arXiv: 2002.09202v1, pp. 1-94. (Year: 2020).*

Zhou et al., "Recommending Themes for Ad Creative Design via Visual-Linguistic Representation" Feb. 27, 2020, arXiv: 2001.07194v2, pp. 1-7. (Year: 2020).*

Mishra et al., "Learning to Create Better Ads: Generation and Ranking Approaches for Ad Creative Refinement" Aug. 17, 2020, arXiv: 2008.07467v1, pp. 1-9. (Year: 2020).*

Gan et al., "Seeking Micro-influencers for Brand Promotion" Oct. 2019, pp. 1933-1941. (Year: 2019).*

Mathur et al., "Endorsements on Social Media: An Empirical Study of Affiliate Marketing Disclosures on YouTube and Pinterest" Oct. 6, 2018, arXiv: 1809.00620v2, pp. 1-26. (Year: 2018).*

Lee et al., "Experiments on Motivational Feedback for Crowdsourced Workers" 2013, pp. 341-350. (Year: 2013).*

Kato et al., "Sharedo: To-Do List Interface for Human-Agent Task Sharing" Oct. 2014, pp. 345-351. (Year: 2014).*

* cited by examiner

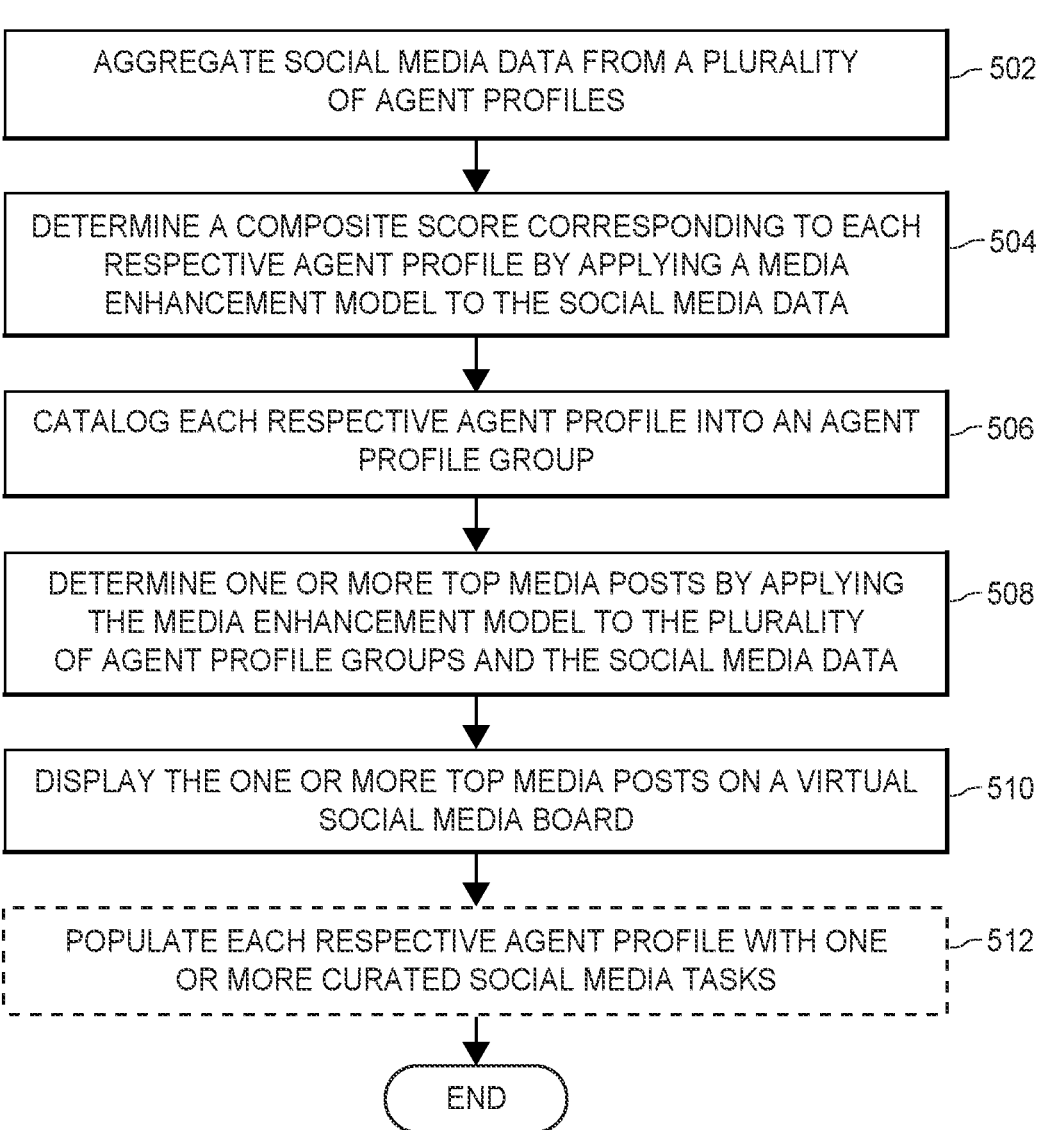

500

AGGREGATE SOCIAL MEDIA DATA FROM A PLURALITY OF AGENT PROFILES ⌐502

DETERMINE A COMPOSITE SCORE CORRESPONDING TO EACH RESPECTIVE AGENT PROFILE BY APPLYING A MEDIA ENHANCEMENT MODEL TO THE SOCIAL MEDIA DATA ⌐504

CATALOG EACH RESPECTIVE AGENT PROFILE INTO AN AGENT PROFILE GROUP ⌐506

DETERMINE ONE OR MORE TOP MEDIA POSTS BY APPLYING THE MEDIA ENHANCEMENT MODEL TO THE PLURALITY OF AGENT PROFILE GROUPS AND THE SOCIAL MEDIA DATA ⌐508

DISPLAY THE ONE OR MORE TOP MEDIA POSTS ON A VIRTUAL SOCIAL MEDIA BOARD ⌐510

POPULATE EACH RESPECTIVE AGENT PROFILE WITH ONE OR MORE CURATED SOCIAL MEDIA TASKS ⌐512

END

FIG. 5

SYSTEM AND METHODS FOR GENERATING TASKS BASED ON AGENT PROFILES

CROSS-REFERENCE TO RELATED APPLICATION

This application claims priority to U.S. Provisional Patent Application No. 63/064,881, entitled "MEDIA ENHANCE-MENT VIRTUAL ASSISTANT," filed on Aug. 12, 2020, the disclosure of which is hereby incorporated herein by reference.

TECHNICAL FIELD

The present disclosure generally relates to systems and methods for performing machine learning tasks, and more particularly to identifying top agent social media profiles and posts to enhance media content and presence.

BACKGROUND

Social media has increasingly become an integral part of commercial viability. In many industries, consumers monitor business entity social media accounts and posts to help inform their purchasing decisions. Accordingly, the demand and overall spending on personnel and computing resources to facilitate robust social media presences increases by the day. As a result, many of these business entities continue to expand their social media presences through multiple authorized accounts (e.g., authorized social media accounts controlled by employees). Ideally, each authorized account holder actively generates posts to increase their (and the business entity's) visibility and that are aligned with the social media strategy of the business entity. Each authorized account holder would also ideally generate posts in a manner known to generate community involvement and/or in response to currently trending subject matter(s) to maximize visibility. Correspondingly, a major point of emphasis for any business entity utilizing authorized social media accounts is optimizing/maximizing the impact such a distributed social media presence may have on their overall performance.

Unfortunately, for business entities with dozens, hundreds, or even thousands of authorized accounts, such an ideal scenario is generally not possible using conventional systems and techniques (e.g., personnel and computing resources devoted to the business entity's social media presence). Conventional systems and techniques are woefully unable to quickly and efficiently disseminate successful posts and posting strategies to all authorized accounts, identify and capitalize on current trends, and generally perform other actions intended to maximize the impact of a business entity's social media presence. Thus, business entities relying on conventional systems and techniques to manage their social media presence may experience major reductions in the activity levels associated with their social media accounts and corresponding reductions in consumer patronage due to the inefficiencies of the conventional system and techniques. Conventional systems and techniques may have other drawbacks as well.

SUMMARY

Generally, the present embodiments relate to analyzing social media data of authorized account holders (also referenced herein as "agents") using a machine learning (ML)

algorithm to create a social media board that enables the agents to draw inspiration for social media posts, posting strategies, etc. from other agents within various regions and social platforms. To generate the social media board, all applicable social media data for each agent may be gathered and cleaned. The ML algorithm may also identify the "top agents" amongst all agents by analyzing the average likes, the number of followers, the posting frequency, the change in the number of followers attributable to each respective agent, and/or any other suitable metric in accordance with a scoring metric. The ML algorithm may also identify the top posts made by these top agents for display on the social media board. Accordingly, other agents can view these top posts and may become inspired to, for example, generate their own organic content.

Additionally, the present embodiments relate to the curation of personalized tasks based on a respective agent's current social media metrics. For example, an administrator may create one or more social media action tasks (also referenced herein as "curated social media tasks") based on the results of the ML algorithm analysis, and specify a metric goal (likes, followers, follower change, range of percentiles, etc.) for each respective agent. In certain embodiments, the ML algorithm may generate some and/or all social media action tasks as a result of the analysis related to each respective agent.

In one aspect, a virtual assistant device for enhancing media content and presence may be provided. The virtual assistant device may comprise one or more processors, and a memory communicatively coupled to the one or more processors. The memory may contain instructions therein that, when executed, cause the one or more processors to: aggregate social media data from a plurality of agent profiles; determine a composite score corresponding to each respective agent profile by applying a media enhancement model to the social media data; catalog each respective agent profile into an agent profile group of a plurality of agent profile groups based upon the composite score corresponding to the respective agent profile; determine one or more top media posts by applying the media enhancement model to the plurality of agent profile groups and the social media data; and display the one or more top media posts on a virtual social media board for viewing by a respective agent associated with each respective agent profile.

In another aspect, a computer-implemented method for enhancing media content and presence may be provided. The method may comprise: aggregating, by one or more processors, social media data from a plurality of agent profiles; determining, by the one or more processors, a composite score corresponding to each respective agent profile by applying a media enhancement model to the social media data; cataloging, by the one or more processors, each respective agent profile into an agent profile group of a plurality of agent profile groups based upon the composite score corresponding to the respective agent profile; determining, by the one or more processors, one or more top media posts by applying the media enhancement model to the plurality of agent profile groups and the social media data; and displaying, by the one or more processors, the one or more top media posts on a virtual social media board for viewing by a respective agent associated with each respective agent profile.

In yet another aspect, a computer readable storage medium comprising non-transitory computer readable instructions stored thereon for enhancing media content and presence may be provided. The instructions when executed on one or more processors may cause the one or more processors to: aggregate social media data from a plurality of agent profiles; determine a composite score corresponding to each respective agent profile by applying a media enhancement model to the social media data; catalog each respective agent profile into an agent profile group of a plurality of agent profile groups based upon the composite score corresponding to the respective agent profile; determine one or more top media posts by applying the media enhancement model to the plurality of agent profile groups and the social media data; and display the one or more top media posts on a virtual social media board for viewing by a respective agent associated with each respective agent profile.

In accordance with the above, and with the disclosure herein, the present disclosure includes improvements in computer functionality or in improvements to other technologies at least because the disclosure describes that, e.g., a hosting server, or otherwise computing device (e.g., a user computing device), is improved where the intelligence or predictive ability of the hosting server or computing device is enhanced by a trained (e.g., machine learning trained) media enhancement model. The media enhancement model, executing on the hosting server or user computing device, is able to accurately identify, based on social media data of other users (e.g., agents), a user-specific ranking(s)/score(s) and social media posting recommendations for the respective user's social media platform(s) designed to improve at least one score or ranking included within the user-specific ranking(s)/score(s). That is, the present disclosure describes improvements in the functioning of the computer itself or "any other technology or technical field" because a hosting server or user computing device, is enhanced with a plurality of training data (e.g., 10,000 s of training social media profiles and corresponding social media data) to accurately predict, detect, or determine user-specific social media trends/recommendations configured to improve the respective user's user-specific ranking(s)/score(s) and overall social media presence. This improves over the prior art at least because existing systems lack such predictive or classification functionality and are simply not capable of accurately analyzing aggregated social media data on a real-time basis to output a predictive result designed to improve a user's overall social media presence by increasing at least one score or ranking included within the user-specific ranking(s)/score(s).

For similar reasons, the present disclosure relates to improvement to other technologies or technical fields at least because the present disclosure describes or introduces improvements to computing devices in the field of social media platforms/devices, whereby the trained media enhancement model executing on the computing devices improves the field of social media platforms/devices with artificial intelligence based analysis of aggregate and user-specific real-time social media data to output a predictive result designed to improve a user's overall social media presence by increasing at least one score or ranking included within the user-specific ranking(s)/score(s).

In addition, the present disclosure includes specific features other than what is well-understood, routine, conventional activity in the field, or adding unconventional steps that confine the claim to a particular useful application, e.g., aggregating real-time social media data to output a predictive result designed to improve a user's overall social media presence by increasing at least one score or ranking included within the user-specific ranking(s)/score(s), as described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 5 is a flowchart illustrating a method for enhancing media content and presence, in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION

Authorized social media accounts generally suffer from a lack of available information regarding trending posts and posting strategies that directly correspond to their particular corporate social media strategy. In order to provide accurate, timely, and actionable information, the techniques disclosed herein generally describe aggregating social media data from authorized agent profiles and determining top posts and posting strategies utilizing machine learning algorithms and models. The ML algorithms and models may categorize agent profiles based on the aggregated social media data to determine which top posts and posting strategies to suggest.

Further, based on the categorizations, administrators and/or the ML models and algorithms may generate a curated list of posts, social media tasks, or posting strategies to improve the metrics derived from the social media data each agent profile. Thus, the present techniques may provide information to authorized social media accounts in an efficient, streamlined manner that may improve activity levels across a business entity's social media platforms, foster increased consumer visibility and interest, and ultimately generate consumer patronage through responsive, engaging social media content.

Exemplary Media Content and Presence Enhancement System

Figure 1:
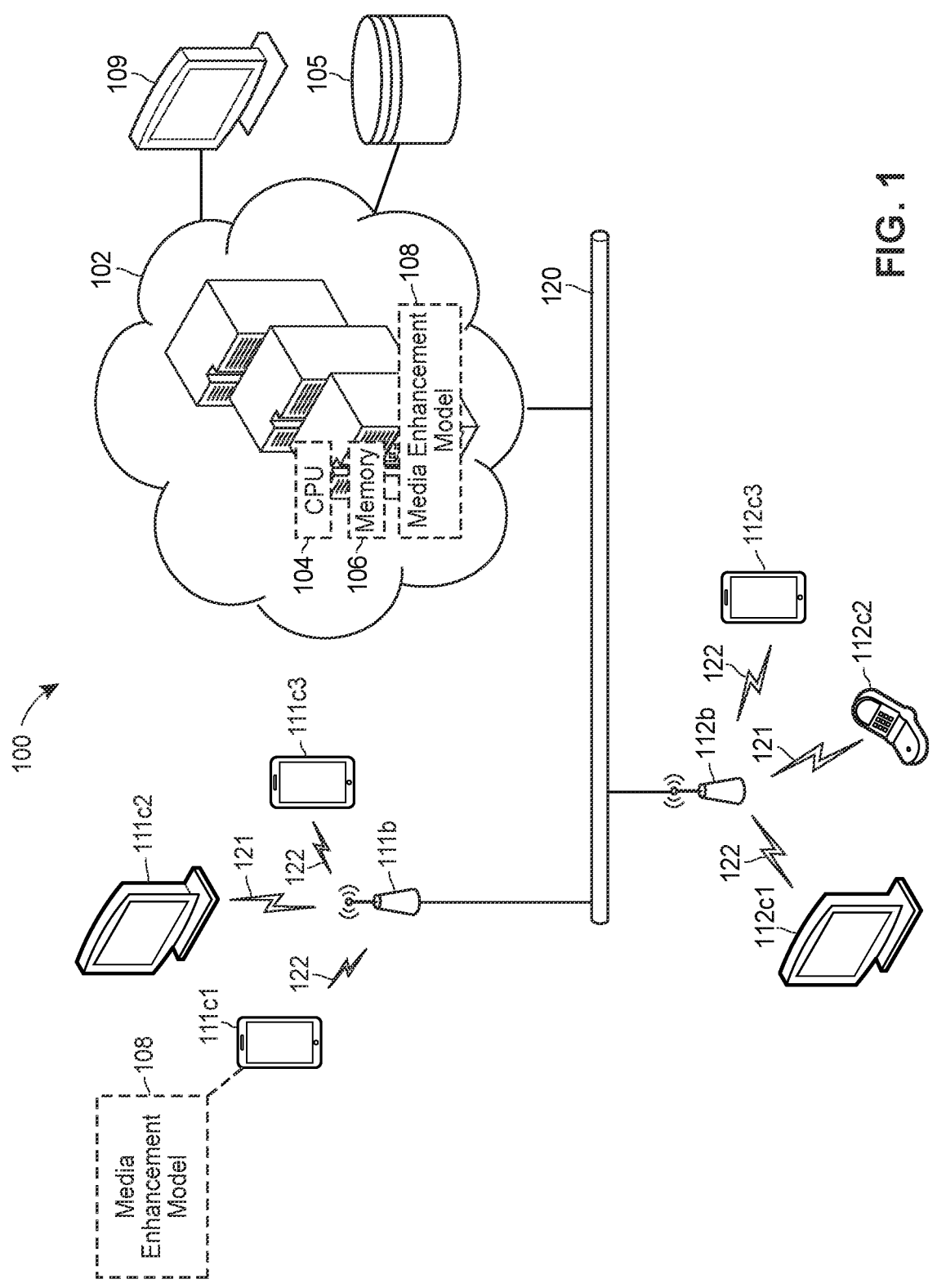
FIG. 1 illustrates an example media enhancement system configured to analyze agent social media data for determining an agent score, an agent ranking, and/or recommendations, in accordance with various embodiments disclosed herein.

FIG. 1 illustrates an example media enhancement system 100 configured to analyze agent social media data for determining an agent score, an agent ranking, and/or recommendations, in accordance with various embodiments disclosed herein. In the example embodiment of FIG. 1, media enhancement system 100 includes server(s) 102 (additionally referenced herein as "hosting servers"), which may comprise one or more computer servers. In various embodiments server(s) 102 comprise multiple servers, which may comprise a multiple, redundant, or replicated servers as part of a server farm. In still further embodiments, hosting server(s) 102 may be implemented as cloud-based servers, such as a cloud-based computing platform. For example, server(s) 102 may be any one or more cloud-based platform(s) such as MICROSOFT AZURE, AMAZON AWS, or the like. Server(s) 102 may include one or more processor(s) 104 as well as one or more computer memories 106.

The memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memorie(s) 106 may store an operating system (OS) (e.g., Microsoft Windows, Linux, Unix, etc.) capable of facilitating the functionalities, apps, methods, or other software as discussed herein. The memorie(s) 106 may also store a media enhancement model 108, which may be an artificial intelligence based model, such as a machine learning model trained on various social media data, as described herein. Additionally, or alternatively, the media enhancement model 108 may also be stored in database 105, which is accessible or otherwise communicatively coupled to hosting server(s) 102, and/or in the memorie(s) of one or more user computing devices 111c1-111c3 and/or 112c1-112c3 (additionally referenced herein as "agent computing devices"). The memories 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a social media based machine learning model or component, such as the media enhancement model 108, where each may be configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

The processor(s) 104 may interface with the memory 106 via the computer bus to execute the operating system (OS). The processor(s) 104 may also interface with the memory 106 via the computer bus to create, read, update, delete, or otherwise access or interact with the data stored in the memories 106 and/or the database 104 (e.g., a relational database, such as Oracle, DB2, MySQL, or a NoSQL based database, such as MongoDB). The data stored in the memories 106 and/or the database 105 may include all or part of any of the data or information described herein, including, for example, training data and/or user data (e.g., either of which including any relevant social media data) or other information of the user, including agent status, location, or the like.

The hosting server(s) 102 may further include a communication component configured to communicate (e.g., send and receive) data via one or more external/network port(s) to one or more networks or local terminals, such as computer network 120 and/or terminal 109 (for rendering or visualizing) described herein. In some embodiments, hosting server(s) 102 may include a client-server platform technology such as ASP.NET, Java J2EE, Ruby on Rails, Node.js, a web service or online API, responsive for receiving and responding to electronic requests. The hosting server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein. According to some embodiments, the hosting server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Hosting server(s) 102 may further include or implement an operator interface configured to present information to an administrator or operator and/or receive inputs from the administrator or operator. As shown in FIG. 1, an operator interface may provide a display screen (e.g., via terminal 109). Hosting server(s) 102 may also provide I/O components (e.g., ports, capacitive or resistive touch sensitive input panels, keys, buttons, lights, LEDs), which may be directly accessible via or attached to hosting server(s) 102 or may be indirectly accessible via or attached to terminal 109. According to some embodiments, an administrator or operator may access the server 102 via terminal 109 to review information, make changes, input training data or images, and/or perform other functions.

As described above herein, in some embodiments, hosting server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, hosting server(s) 102 are communicatively connected, via computer network 120 to the one or more agent computing devices 111c1-111c3 and/or 112c1-112c3 via base stations 111b and 112b. In some embodiments, base stations 111b and 112b may comprise cellular base stations, such as cell towers, communicating to the one or more agent computing devices 111c1-111c3 and 112c1-112c3 via wireless communications 121 based on any one or more of various mobile phone standards, including NMT, GSM, CDMA, UMMTS, LTE, 5G, or the like. Additionally or alternatively, base stations 111b and 112b may comprise routers, wireless switches, or other such wireless connection points communicating to the one or more agent computing devices 111c1-111c3 and 112c1-112c3 via wireless communications 122 based on any one or more of various wireless standards, including by non-limiting example, IEEE 802.11a/b/c/g (WIFI), the BLUETOOTH standard, or the like.

Any of the one or more agent computing devices 111c1-111c3 and/or 112c1-112c3 may comprise mobile devices and/or client devices for accessing and/or communications with hosting server(s) 102. In various embodiments, agent computing devices 111c1-111c3 and/or 112c1-112c3 may comprise a cellular phone, a mobile phone, a tablet device, a desktop computer, a personal data assistance (PDA), or the like, including, by non-limiting example, an APPLE iPhone or iPad device or a GOOGLE ANDROID based mobile phone or tablet. In still further embodiments, agent computing devices 111c1-111c3 and/or 112c1-112c3 may comprise a home assistant device and/or personal assistant device, e.g., having display screens, including, by way of non-limiting example, any one or more of a GOOGLE HOME device, an AMAZON ALEXA device, an ECHO SHOW device, or the like.

In addition, the one or more agent computing devices 111c1-111c3 and/or 112c1-112c3 may implement or execute an operating system (OS) or mobile platform such as Apple's iOS, Google's Android operating system, Microsoft's Windows operating system, or the like. Any of the one or more agent computing devices 111c1-111c3 and/or 112c1-112c3 may comprise one or more processors and/or one or more memories for storing, implementing, or executing computing instructions or code, e.g., a mobile application or a home or personal assistant application, as described in various embodiments herein. Each of the one or more agent computing devices 111c1-111c3 and/or 12c1-112c3 may also store agent profile social media data and/or the media enhancement model 108 locally on the one or more memories.

Agent computing devices 111c1-111c3 and/or 112c1-112c3 may comprise a wireless transceiver to receive and transmit wireless communications 121 and/or 122 to and from base stations 111b and/or 112b. Pixel based images 202a, 202b, and/or 202c may be transmitted via computer network 120 to hosting server(s) 102 for training of model(s) and/or imaging analysis as describe herein.

In addition, the one or more agent computing devices 111c1-111c3 and/or 112c1-112c3 may include a digital camera and/or digital video camera for capturing or taking digital images and/or frames. Each digital image may comprise pixel data that may also be used for training or implementing model(s), such as AI or machine learning models, as described herein. For example, a digital camera and/or digital video camera of, e.g., any of agent computing devices 111c1-111c3 and/or 112c1-112c3 may be configured to take, capture, or otherwise generate digital images (e.g., pixel based images) and, at least in some embodiments, may store such images in a memory of a respective user computing devices.

Still further, each of the one or more agent computer devices 111c1-111c3 and/or 112c1-112c3 may include a display screen for displaying graphics, images, text, social media recommendations, data, pixels, features, and/or other such visualizations or information as described herein. In various embodiments, graphics, images, text, social media recommendations, data, pixels, features, and/or other such visualizations or information may be received by server(s) 102 for display on the display screen of any one or more of agent computer devices 111c1-111c3 and/or 112c1-112c3. Additionally or alternatively, an agent computer device may comprise, implement, have access to, render, or otherwise expose, at least in part, an interface or a guided user interface (GUI) for displaying text and/or images on its display screen.

Exemplary Social Media Data Workflow

Figure 2:
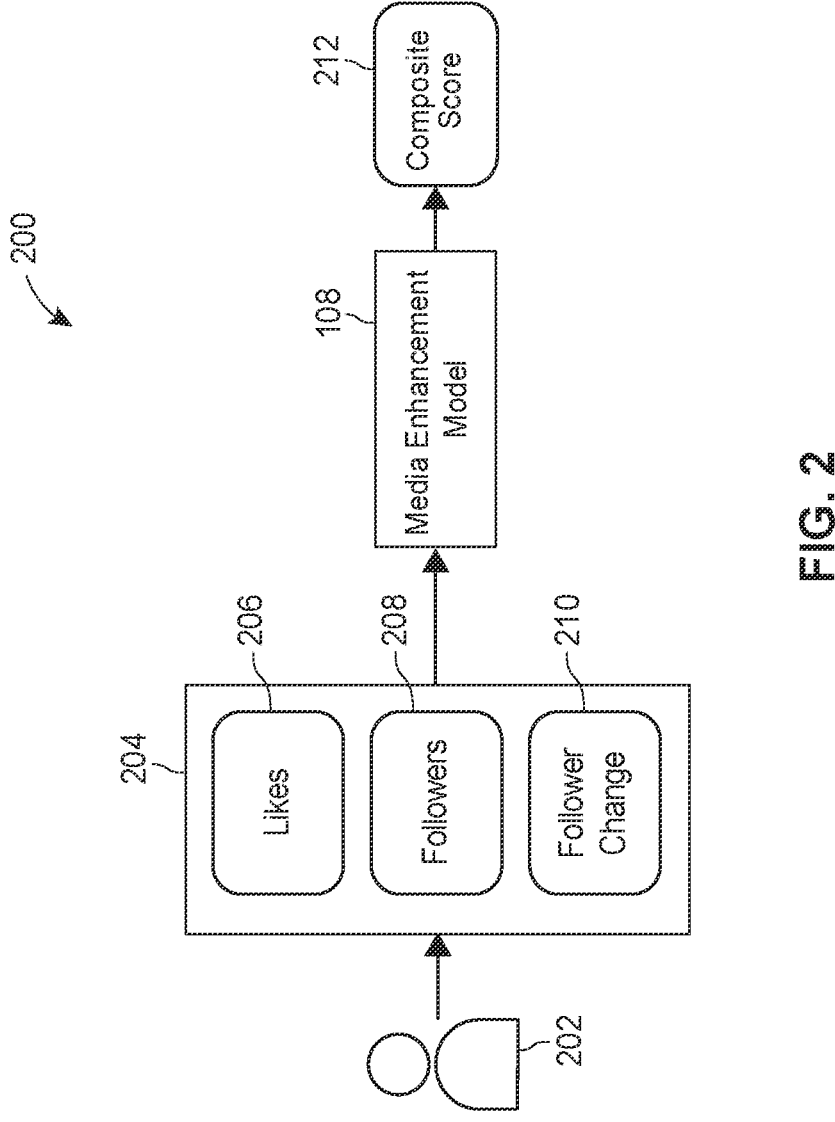
FIG. 2 depicts how social media data is used to determine score(s)/ranking(s) for agents as part of the media enhancement system of FIG. 1, in accordance with various embodiments disclosed herein.

FIG. 2 depicts a social media data workflow 200 indicating how social media data may be used to determine score(s)/ranking(s) as part of the media enhancement system 100. Generally, the hosting server(s) 102 may aggregate social media data from one or more agent profiles. The hosting server(s) 102 may then apply an algorithm (e.g., the media enhancement model 108) to the aggregated data to generate, for example, a composite score, a ranking, and/or recommendations related to each respective agent profile.

More specifically, the hosting server(s) 102 may access one or more agent profiles 202 to extract a plurality of social media data 204 related to the corresponding agent. The hosting server(s) 102 may, for example, access or request access to an agent computing device (e.g., agent computing device 111c1) where the plurality of social media data 204 is stored locally. When the hosting server(s) 102 receives permission and/or otherwise gains access to the plurality of social media data 204 stored on the agent computing device, the server(s) 102 may copy and clean all data included in the plurality of social media data 204. The hosting server(s) 102 may clean the social media data, for example, by removing personal identification data or any other sensitive information. Further, the hosting server(s) 102 may include a predetermined list of social media data types to be copied from the social media data. The predetermined list may include social media data types such as the number of likes a particular post or the agent's average post receives, the number of followers for an agent profile, the change in the number of followers over time for an agent profile, and/or any other suitable data type. Of course, the hosting server(s) 102 may additionally or alternatively automatically determine data types for extraction/cleaning by applying the media enhancement model 108 to agent profiles 202 directly.

Additionally or alternatively, the hosting server(s) 102 may request data from one or more individual agent computing devices, and the agent computing devices may then aggregate, copy, and clean the data. Moreover, in embodiments, the social media data 204 may be stored on a social media hosting server (e.g., a remote server) to which the agent computing device has access via entry of agent profile credentials (e.g., agent username and password). In these embodiments, the hosting server(s) 102 may request that the agent computing device transmit the agent profile credentials for access to the social media hosting server to retrieve the social media data.

As an example, a respective agent profile 202 may include data such as likes 206 related to one or an average number of social media posts, followers 208 currently or formerly following the respective agent profile, follower changes 210 over time, etc. The hosting server(s) 102 may transmit a request (e.g., via the network 120) to a respective agent computing device containing the data representative of the respective agent profile 202 for some or all of the data representative of the respective agent profile 202 included therein. When the respective agent computing device receives the request, the respective agent computing device may retrieve/obtain the relevant data from the respective agent profile 202 (if stored locally), or the respective agent computing device may further request the relevant data from a remote storage device using the agent profile credentials to gain access the remotely stored data. In either case, the respective agent computing device may transmit the relevant data from the respective agent profile 202 to the hosting server(s) 102. The hosting server(s) 102 may then repeat these actions and/or other actions or any combination thereof to aggregate a respective plurality of social media data 204 from each of one or more agent profiles 202 and analyze the aggregated social media data using the media enhancement model 108.

The media enhancement model 108 may apply a machine learning or other AI algorithm to the aggregated social media data (e.g., a plurality of social media data 204 sets derived from a plurality of agent profiles 202) to generate, for example, a composite score 212. Generally, the media enhancement model 108 analyzes values associated with each respective social media data type (e.g., number of likes 206, number of followers 208, follower change 210 over time, etc.) included in the aggregated social media data by applying one or more weighting values to each social media data type value and combining these weighted values to achieve a composite score 212. For example, the composite score 212 may represent a numerical value between zero and one-hundred, where agent profiles 202 receiving a composite score 212 of substantially zero have relatively few likes 206, followers 208, follower change 210, etc. relative to agent profiles 202 receiving a composite score 212 of substantially one-hundred. Of course, as previously mentioned, the composite score 212 may include various features similar to a ranking and/or recommendations related to each respective agent profile.

In any event, as a result of the media enhancement model 108 generating the composite score 212, the hosting server(s) 102 may determine "top" agent profiles, and by extension, "top" agent posts/hashtags/etc. by determining agent profiles 202 that correspond to the "top" composite scores 212. For example, in the example previously described, the hosting server(s) 102 may determine agent profiles 202 receiving a composite score 212 of substantially one-hundred to be "top" agent profiles. Correspondingly, the hosting server(s) 102 may analyze the activity of each "top" agent profile to determine the posts/hashtags/etc. associated with each "top" agent profile that received a substantial amount of attention (e.g., likes, comments, retweets, etc.) on one or more social media platform(s), and may designate one or more of these posts/hashtags/etc. as a "top" agent post/hashtag/etc. The media enhancement model 108 may additionally organize or sort each of the "top" agent profiles and "top" agent posts/hashtags/etc. by geographical region (e.g., U.S., Canada, Northeast U.S., Southwest U.S., Illinois, New York, Cook County, Jefferson Parish, etc.), chronological order, general topic (e.g., trending news stories, insurance-related posts, etc.), and/or any other suitable sorting metric or combination thereof. Moreover, the media enhancement model 108 may identify a "top" agent post/hashtag/etc. that is not associated with a "top" agent profile because the "top" agent post/hashtag/etc. received an unusually large amount of attention relative to the average posts/hashtags/etc. associated with the respective agent profile 202.

Exemplary Social Media Board Interface

Figure 3:
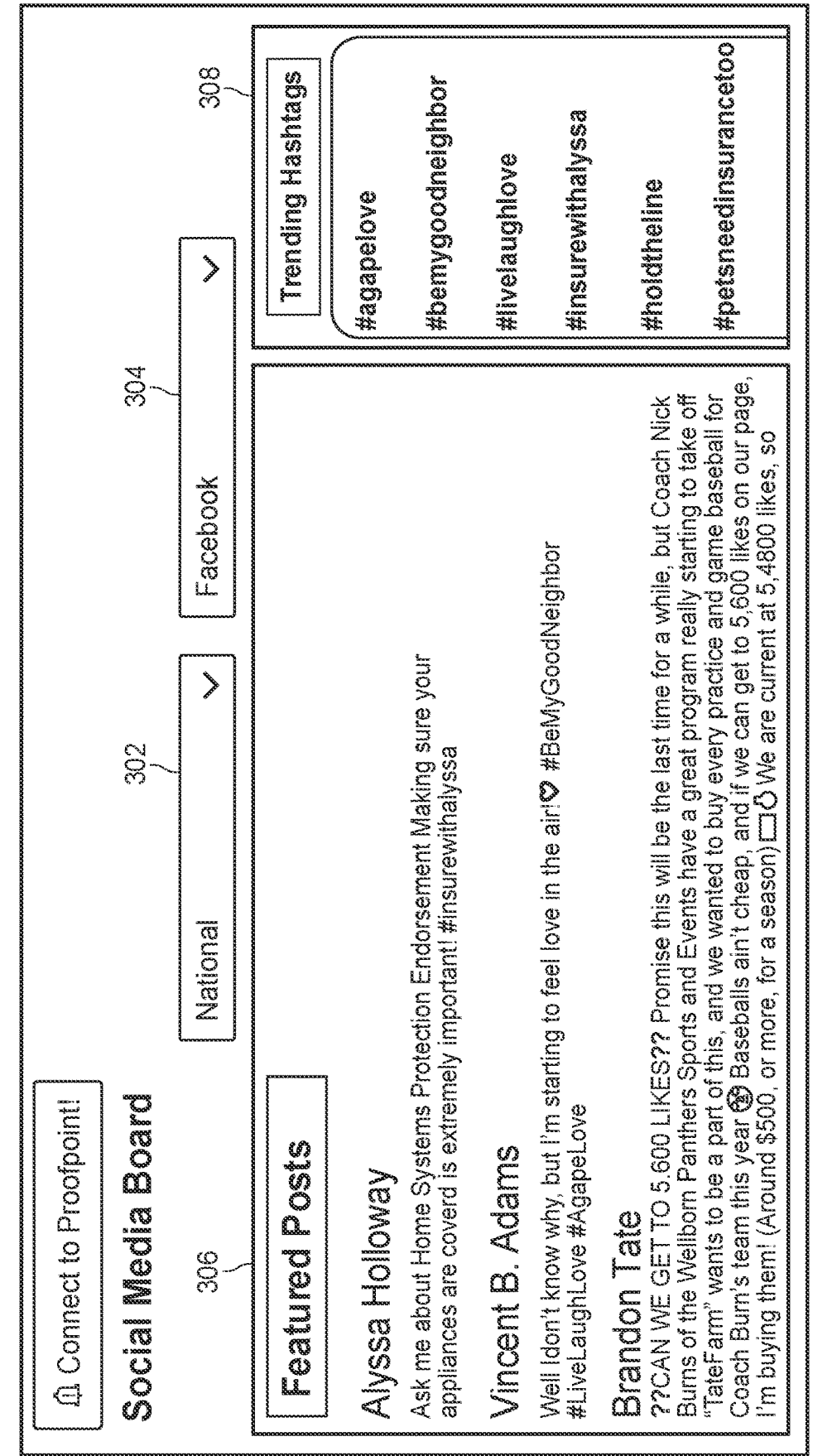
FIG. 3 depicts a social media board interface used to display, for example, top posts and hashtags, as aggregated in FIG. 2, from agent accounts on a national or regional scale to serve as inspiration for agents to create their own organic content, in accordance with various embodiments disclosed herein.

FIG. 3 depicts a social media board interface 300 used to display, for example, top posts and hashtags nationally or per region, as aggregated in FIG. 2, to serve as inspiration for agents to create their own organic content. Generally, the social media board interface 300 may represent an interface of a social media application a user (e.g., an agent) may access via a user computing device (e.g., agent computing device 111*c*1). The social media board interface 300 may include social media information such as featured posts from other users (e.g., agents) who are subscribed and/or otherwise have permission to participate in the media enhancement system 100, featured hashtags from other users, and/or any other similar information or combinations thereof.

The social media board interface 300 generally includes features configured to enable a user (e.g., an agent) to view and/or interact with social media content determined through application of the media enhancement model 108 to social media data aggregated from one or more agent profiles (e.g., agent profile 202). Namely, the social media board interface 300 may include a first filtering option 302 and a second filtering option 304, where both options 302, 304 are configured to enable an agent to filter top posts/hashtags/etc. based upon various filtering criteria. For example, the first filtering option 302 may correspond to geographical regions of origin corresponding to the displayed posts/hashtags/etc. As illustrated in FIG. 3, an agent may select a "National" filter for the first filtering option 302 to receive top posts/hashtags/etc. originating across an entire nation (e.g., top posts/hashtags/etc. originating from U.S.A., Canada, Germany, etc.). Of course, the "National" filter and/or any other filter chosen from the first filtering option 302 list may refer to top posts/hashtags/etc. originating from a nation in which the agent is currently located, or to any country which the agent indicates (e.g., via internal application settings). The second filtering option 304 may correspond to respective social media platforms from which the top posts/hashtags/etc. originated. For example, an agent may desire to see the top posts/hashtags/etc. that originated on Facebook, and may accordingly select the "Facebook" filter from the second filtering option 304 list. It is to be understood that the social media board interface 300 may include any suitable number of filtering options, and each filtering option may include any suitable number of filters.

When the agent selects a filter from either or both of the first filtering option 302 and/or the second filtering option 304, the hosting server(s) 102 may display (via the social media board interface 300) the top agent posts in the featured posts region 306, and the server(s) 102 may display the top agent hashtags in the trending hashtags region 308. The featured posts region 306 may display the top agent posts, for example, in a descending order based upon agent profile composite score with the agent profile receiving the highest composite score receiving the top position within the featured posts region 306. Similarly, the trending hashtags region 308 may display the top agent hashtags, for example, in a descending order based upon agent profile composite score with the agent profile receiving the highest composite score receiving the top position within the trending hashtags region 308. Additionally or alternatively, an agent may preferentially sort the posts/hashtags/etc. displayed in the featured posts region 306 and the trending hashtags region 308 based upon a posting preference (e.g., preferential topics for the agent including, for example, re-posting contemporary articles, insurance-related advice, etc.) and/or any other suitable sorting metric or combination thereof. Moreover, it is to be understood that the social media board interface 300 may include as many or more display regions (e.g., 306, 308) as categories of data aggregated by the hosting server(s) 102 (e.g., number of likes 206, number of followers 208, follower change 210).

In embodiments, the media enhancement model 108 may preferentially sort the top agent posts/hashtags/etc. for display to an agent based upon the agent's posting/profile history. For example, an agent may historically author posts directed to a singular category (e.g., topical news stories, trending business incites, insurance-related content, etc.). Accordingly, the media enhancement model 108 may preferentially sort through the top agent posts/hashtags/etc. to determine posts/hashtags/etc. that correspond to the posting history of the agent. As described further herein, the media enhancement model may conduct, for example, a semantic analysis of language contained in posts/hashtags/etc. to determine content, context, support/opposition, and/or other semantic cues associated with a text contained in a post/hashtag/image/.gif file/etc. As a result, the media enhancement model 108 may determine posts/hashtags/etc. that correspond to the general posting history for each respective agent.

Exemplary Social Media Task Panel Interface

Figure 4:
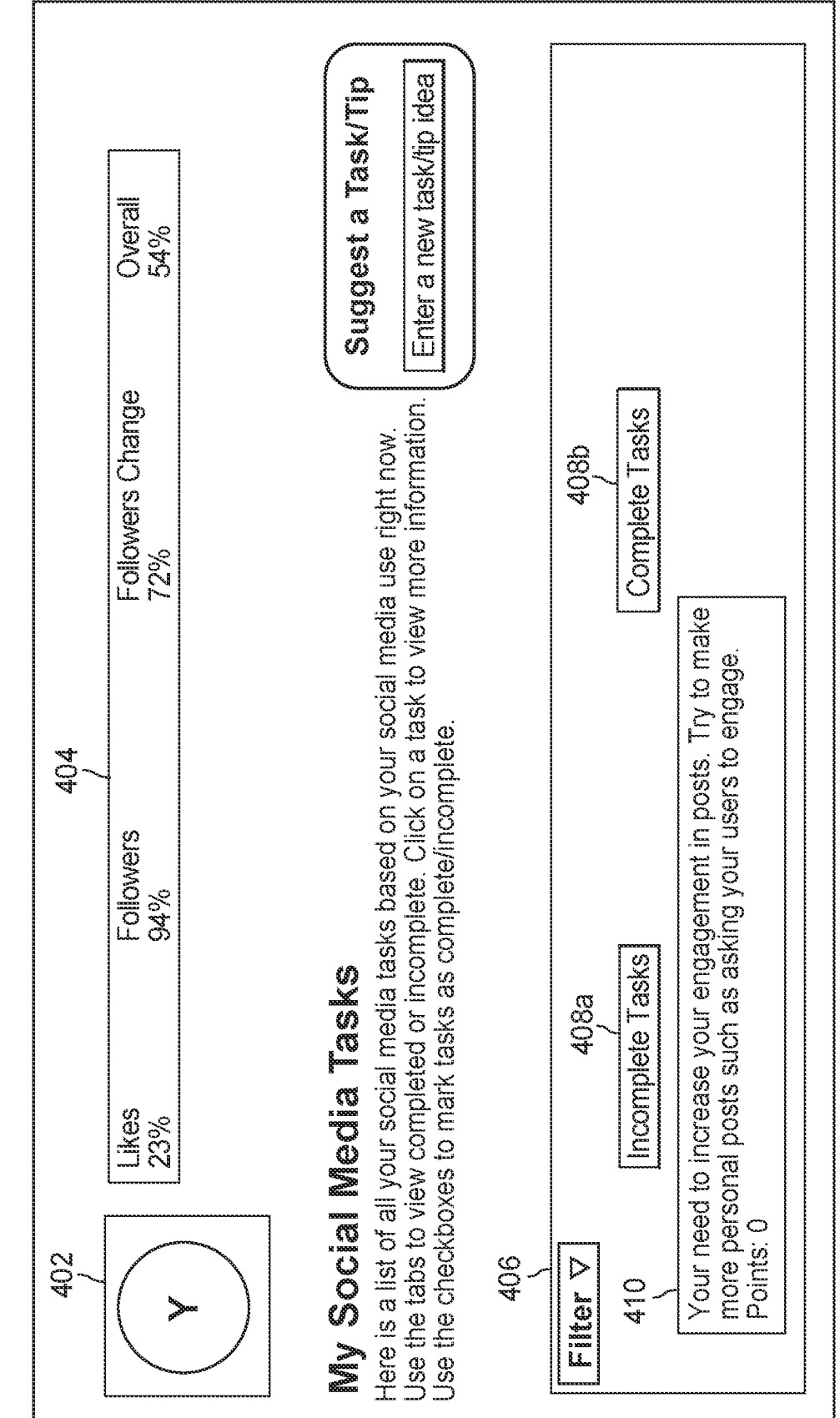
FIG. 4 depicts a social media tasks panel configured to display percentiles for different categories, displayed in FIG. 2, and to display personalized tasks on how agents may improve their respective scores, rankings, etc., in accordance with various embodiments disclosed herein.

FIG. 4 depicts a social media tasks panel 400 that may represent an interface of a social media application a user (e.g., an agent) may access via a user computing device (e.g., agent computing device 111*c*1). Generally, the social media tasks panel 400 may be configured to display percentiles for different categories of social media data (e.g., social media data 204) associated with a respective agent profile (e.g., agent profile 202) and display personalized tasks intended to help agents improve their respective scores, rankings, etc. The personalized tasks displayed within the social media tasks panel 400 may describe a post, a posting strategy (e.g., multiple posts), a post type, and/or any other recommendations or combinations thereof.

The social media tasks panel 400 may include a user profile indication 402 to indicate the current user for whom social media percentiles (displayed in the percentiles region 404) and personalized tasks (displayed in the tasks region 406) are displayed. The percentiles region 404 may generally contain the social media percentile data corresponding to an agent, and the data may include, for example, percentiles the agent falls into with respect to some/all other agent profiles relative to each of a number of likes, a number of followers, follower changes over time, an overall social media score, and/or any other suitable category or combination thereof. Namely, a particular agent may have as many or more likes on posts/hashtags/etc. associated with their respective agent profile as twenty-three percent of all agent profiles represented within the aggregated social media data. Accordingly, as illustrated in FIG. 4, the percentile displayed in the percentiles region 404 corresponding to the number of likes for the particular agent may be twenty-three percent. Of course, the percentiles displayed in the percentiles region 404 may reflect a percentage change of the indicated values with respect to some or all of the agent profiles included in the aggregated social media data and/or any other suitable indication or combination thereof.

Generally, the tasks region 406 may display one or more personalized tasks for an agent to complete in order to improve the agent's social media presence/engagement. More specifically, the tasks region 406 may display both incomplete tasks (under the incomplete tasks region 408*a*) and completed tasks (under the complete tasks region 408*b*). Incomplete tasks may refer to tasks determined by the media enhancement model 108 and displayed within the social media tasks panel 400 that an agent has not yet performed. Accordingly, complete tasks may refer to tasks determined by the media enhancement model 108 and displayed within the social media tasks panel 400 that an agent has performed. In either case, the tasks may suggest, for example, that an agent generate a post with respect to a particular subject matter, include a particular hashtag in a subsequent post, repost a popular or currently trending post/hashtag, consistently generate posts based upon a particular topic, and/or any other suitable action or combination thereof.

For example, as illustrated in FIG. 4, the incomplete tasks region 408*a* may include an incomplete task 410 indicating to an agent that their engagement in posts is relatively low compared to other agents. The incomplete task 410 further suggests to the agent that making more personal posts and asking users to engage may increase post engagement. Moreover, each incomplete task may also include a point value or other scoring indicator to communicate to an agent how performing the incomplete task may impact their composite score (e.g., composite score 212) and/or ranking(s) (as reflected in the percentiles region 404). When the agent completes the incomplete task 410, the hosting server(s) 102 may determine that the incomplete task 410 is complete, and may further display the incomplete task 410 under the complete tasks region 408*b*.

Exemplary Method for Enhancing Media Content and Presence

FIG. 5 is a flow diagram of an example method 500 for enhancing media content and presence, in accordance with various embodiments herein. The actions performed herein with respect to the example method 500 may be performed by, for example, the hosting server(s) 102 and/or an agent computing device (e.g., agent computing device 111c1). The method 500 begins when the hosting server(s) 102 aggregates social media data from a plurality of agent profiles (block 502). As previously mentioned, the social media data (e.g., social media data 204) may include one or more social media data types. For example, the social media data types may include a number of likes a particular post or the agent's average post receives, a number of followers for an agent profile, a change in the number of followers over time for an agent profile, and/or any other suitable data type.

The method 500 further includes determining a composite score corresponding to each respective agent profile by applying a media enhancement model (e.g., media enhancement model 108) to the social media data (block 504). To determine the composite score, the ML algorithm or other AI algorithm included in the media enhancement model 108 may normalize the values corresponding to each social media data type included in the social media data to account for size differences between and among agent profiles. For example, the ML algorithm or other AI algorithm included in the media enhancement model 108 may compare the values of each social media data type on a per-follower-basis to get an accurate representation of agent profile engagement/presence that is normalized for follower count. Once normalized, the ML algorithm or other AI algorithm included in the media enhancement model 108 may determine a percentile out of one-hundred for each social media data type and a cumulative score. Generally, the cumulative score may represent an overall evaluation of a respective agent profile engagement/presence based on weighted values of each social media data type. For example, the media enhancement model 108 may include and apply weights of 0.5 for average likes per post, 0.3 for number of followers, and 0.2 for follower change over time. Moreover, the ML algorithm or other AI algorithm included in the media enhancement model 108 may support flexibly manipulating each of these weights based upon the data types included in the aggregated social media data, agent preferences, and/or any other suitable input or combination thereof.

Additionally or alternatively, the media enhancement model 108 may normalize the score generated for each respective agent profile by dividing the value corresponding to a particular data type for each agent profile by the largest or best value corresponding to the particular data type included in the aggregated social media data. To illustrate, a first agent profile may include twenty total likes, a second agent profile may include forty total likes, and a third agent profile may include eighty total likes. In this example, the third agent profile like total is the largest of the three, and as a result, each of the first agent profile like total (twenty) and the second agent profile like total (forty) may be divided by the third agent profile like total (eighty) to determine a normalized value corresponding to the number of likes. Accordingly, the first agent profile may receive a normalized value of 0.25 or twenty-five percent, the second agent profile may receive a normalized value of 0.5 or fifty percent, and the third agent profile may receive a normalized value of 1 or one-hundred percent. Consequently, each of these normalized values may be evaluated in tandem by the ML algorithm or other AI algorithm included in the media enhancement model 108 by applying weights for each social media data type to the respective normalized values to determine a composite score.

In embodiments, the media enhancement model evaluates each of (i) an average number of likes included in the social media data for a respective agent profile, (ii) a number of followers included in the social media data for a respective agent profile, (iii) a posting frequency included in the social media data for a respective agent profile, and (iv) a change in followers included in the social media data for a respective agent profile in accordance with a weighting algorithm to determine the composite score corresponding to each respective agent profile. Of course, it will be appreciated that any suitable social media data type or metric may be measured and/or evaluated in accordance with the embodiments described herein to determine a composite score.

The method 500 may further include cataloging each respective agent profile into an agent profile group of a plurality of agent profile groups based upon the composite score corresponding to the respective agent profile (block 506). The media enhancement model 108 may catalogue each respective agent profile into an agent profile group by defining in real-time (or based upon a predetermined list) partitions between and among composite scores to distribute agent profiles between and among the plurality of agent profile groups. For example, the media enhancement model 108 may determine in real-time that the composite scores of the plurality of agent profiles are evenly distributed among the bottom third, the middle third, and the top third of the percentile range (e.g., 1-33%, 34-66%, and 67-100%). Thus, the media enhancement model 108 may automatically generate three partitions to serve as the agent profile groups, where a first partition may include the bottom third of the composite scores, a second partition may include the middle third of the composite scores, and a third partition may include the top third of the composite scores. The media enhancement model 108 may then catalogue each respective agent profile into one of three agent profile groups based upon whether the composite score for the respective agent profile falls within the bottom third, middle third, or top third of all composite scores.

Additionally or alternatively, the media enhancement model 108 may catalogue each respective agent profile into an agent profile group by defining the agent profile groups in a manner such that, when populated with the agent profiles, the number of agent profiles distributed across all agent profile groups satisfies a binomial distribution, a normal distribution, a Poisson distribution, and/or any other suitable statistical distribution or interpretive method.

Further, in embodiments, the media enhancement model 108 may re-introduce the follower count for each respective agent profile to generate multiple sets of agent profile groups based on follower count. For example, assume that a first plurality of agent profiles are relatively newer than a second plurality of agent profiles. The second plurality of agent profiles may have a significantly higher number of followers than the first plurality of agent profiles, and may also have significantly higher data values reflective of active engagement from their followers (e.g., high correspondence between follower number and likes-per-post, etc.). Thus, assuming further that the social media data that is aggregated and evaluated includes data types indicative of engagement (e.g., number of likes, number of comments, etc.), an evaluation by the media enhancement model 108 featuring equal numbers of agent profiles from the first plurality of agent profiles and the second plurality of agent profiles may likely include a disproportionate number of the second plurality of agent profiles receiving higher composite scores than the first plurality of agent profiles. Accordingly, the media enhancement model 108 may detect a profile imbalance within the agent profile groups based upon the number of followers, and the media enhancement model 108 may separate the first plurality of agent profiles and the second plurality of agent profiles to generate separate sets of agent profile groups. In this manner, the media enhancement model 108 may provide more tailored advice for both the first and the second plurality of agent profile groups because they are both being compared in a more even-handed manner to more similarly-established profiles.

The method 500 may further include determining one or more top media posts (e.g., top posts/hashtags/etc.) by applying the media enhancement model to the plurality of agent profile groups and the social media data (block 508). Generally, and as previously described, the media enhancement model 108 may determine one or more top agent profiles, and then determine the one or more top media posts from the one or more top agent profiles. The media enhancement model 108 may, for example, determine that the agent profiles included in a respective agent profile group corresponding to the highest composite scores may comprise the one or more top agent profiles. The media enhancement model 108 may then conduct a sentiment analysis on each media post associated with the one or more top agent profiles to determine the one or more top media posts. Namely, the media enhancement model 108 may conduct a sentiment analysis on comments associated with each media post associated with the one or more top agent profiles by, generally speaking, analyzing comment text and grading the text based upon the relative positivity/negativity of the text. In this manner, the media enhancement model 108 may determine how the top agent's post was received by its viewers.

Additionally or alternatively, the media enhancement model 108 may determine the one or more top media posts by identifying posts made by respective top agents that performed particularly well compared to the average posts of the respective top agents in terms of number of likes. For example, if a respective media post made by a respective top agent received no comments, but received much higher than an average number of likes for the respective top agent, then the media enhancement model 108 may determine that the respective media post outperformed the average post of the respective top agent and may further include the respective media post in the one or more top media posts. Accordingly, in embodiments, the media enhancement model 108 may compare a number of likes corresponding to a media post associated with a top agent profile to an average number of likes associated with the top agent profile to determine the one or more top media posts.

The method 500 may further include displaying the one or more top media posts on a virtual social media board (e.g., social media board interface 300) for viewing by a respective agent associated with each respective agent profile (block 510). Generally, as previously described, the hosting server(s) 102 may display the one or more top media posts (e.g., top agent posts/hashtags/etc.) in an interactive interface configured to enable an agent to view the best performing (in terms of likes, comments, positive change in followers, etc.) media posts and to suggest to the agent which posts may increase their follower engagement/number. In embodiments, the hosting server(s) 102 may preferentially organize the presentation of the one or more top media posts on the virtual social media board in accordance with one or more preferential topics based upon a historical posting profile associated with an agent. For example, if an agent historically authors posts primarily concerned with a single or a select handful of topics, then the hosting server(s) 102 may generate a historical post profile for the agent indicating that the agent may prefer to view top media posts that correspond to the one or more topics included in the historical post profile. Of course, the hosting server(s) 102 may generate a historical post profile for an agent regardless of the number of topics which the agent chooses to address in their posts. The hosting server(s) 102 may automatically determine and delineate between different topics to develop the historical post profile based upon a textual analysis searching for keywords or phrases, based upon the sentiment analysis performed at block 508, and/or any other suitable technique or combinations thereof.

The method 500 may optionally include populating each respective agent profile with one or more curated social media tasks based upon the respective agent profile group corresponding to the respective agent profile (optional block 512). Each curated social media task may be automatically generated by applying the media enhancement model 108 to one or more top media posts, the plurality of agent profile groups, and/or the social media data. Additionally or alternatively, an administrator/moderator may manually create tasks for each respective agent profile based upon the agent profile group to which the respective agent profile is categorized, the composite score associated with the agent profile, the posts/hashtags/etc. corresponding to the respective agent profile, a historical posting profile of the agent profile, and/or based upon any other suitable data or combinations thereof.

In embodiments, the media enhancement system may iteratively perform some or all of the actions of the method 500 described with respect to blocks 502-508. For example, a moderator or other administration entity overseeing the authorized accounts may desire the aggregation, scoring, and posting of agent posts periodically to continually update each of the one or more agents regarding the contemporary status of each social media platform. Thus, the hosting server(s) 102 may begin the iterative process by designating the social media data as prior social media data and aggregating a set of current social media data from the plurality of agent profiles. The current social media data may include agent profile posts/hashtags/etc. featuring a timestamp indicating the posts/hashtags/etc. were posted following the prior aggregation of social media data (e.g., the posts/hashtags/etc. were posted to a social media platform after the most recent iteration of the method 500).

Using the current social media data, the hosting server(s) 102 may update the composite score corresponding to each respective agent profile by applying the media enhancement model 108 to the current social media data. When the hosting server(s) 102 updates the composite score for each respective agent profile, the server(s) 102 may also catalog each respective agent profile into an agent profile group of the plurality of agent profile groups based upon the composite score corresponding to the respective agent profile. For example, by the time the current social media data is aggregated, a respective agent profile may include additional posts/hashtags/etc. that received more likes than average for the respective agent profile, the respective agent profile may have received an increased number of followers, the comments corresponding to any posts/hashtag/etc. associated with the respective agent profile may have increased in positivity based upon a sentiment analysis, and/or any other suitable change in the respective agent profile or combinations thereof. Accordingly, the media enhancement model 108 may calculate an updated composite score for the respective agent profile that is higher than the prior composite score calculated by the media enhancement model

108 for the respective agent profile. As a result, the hosting server(s) 102 may modify the categorization of the respective agent profile from a first agent profile group to a first agent profile group that more closely corresponds to the updated composite score of the respective agent profile. Of course, it is to be understood that the composite score, and by extension, the agent profile group, for a respective agent profile may increase, decrease, or remain unchanged as a result of any iteration of the method 500, as described herein.

When the hosting server(s) 102 identifies the top agent profiles based upon the categorization, as described herein, the server(s) 102 may also determine one or more current top media posts by applying the media enhancement model 108 to the plurality of agent profile groups and the current social media data. Further, the hosting server(s) 102 may display the one or more current top media posts on the virtual social media board (e.g., social media board interface 300) for viewing by the respective agent associated with each respective agent profile, and designate the current social media data as the prior social media data. The hosting server(s) 102 may iteratively perform each of these actions at a predetermined frequency, or may automatically determine that an update should be performed based upon a threshold number of posts by agent profiles, a threshold level of engagement associated with a particular post/hashtag/etc., and/or based upon any other suitable metric or combinations thereof. In embodiments, the predetermined frequency is determined by the media enhancement model 108 and is based upon the current social media data. Moreover, the hosting server(s) 102 may iteratively conduct each of these actions for any duration of time (e.g., continue to monitor and update for hours, days, months, years, etc.) to ensure that the most up-to-date information is continuously provided to agent profiles.

In embodiments, the hosting server(s) 102 may train the media enhancement model 108 using a set of training agent profiles, each including a plurality of training social media data. The hosting server(s) 102 may train the media enhancement model 108 until the composite scores generated as a result of the model 108 satisfy a composite score threshold. The composite score threshold may represent a root-mean-squared (RMS) error value, an average error value, and/or any other suitable metric or combinations thereof. For example, a system administrator or other entity may input the set of training agent profiles and a set of training composite scores, each corresponding to a respective training agent profile, into the hosting server(s) 102 to train the media enhancement model 108. The media enhancement model 108 may generate a set of composite scores for each of the training agent profiles, and the server(s) 102 may compare these composite scores to the corresponding training composite scores. If the generated composite scores satisfy the composite score threshold when compared to the corresponding training composite scores, then the media enhancement model 108 has reached a satisfactory level of accuracy when generating composite scores for agent profiles. Accordingly, the system administrator or other entity may define the composite score threshold to be any suitable value such that the media enhancement model 108 consistently generates accurate composite scores for agent profiles.

Thus, in accordance with the disclosure herein, the present disclosure includes improvements in computer functionality or in improvements to other technologies at least because the disclosure describes that a hosting server or computing device (e.g., an agent computing device), is improved where the intelligence or predictive ability of the hosting server or computing device is enhanced by a trained (e.g., machine learning trained) media enhancement model. The media enhancement model, executing on the hosting server or user computing device, is able to accurately identify, based on social media data of other users (e.g., agents), a user-specific ranking(s)/score(s) and social media posting recommendations for the respective user's social media platform(s) designed to improve at least one score or ranking included within the user-specific ranking(s)/score(s). That is, the present disclosure describes improvements in the functioning of the computer itself or "any other technology or technical field" because a hosting server or user computing device, is enhanced with a plurality of training data (e.g., 10,000 s of training social media profiles and corresponding social media data) to accurately predict, detect, or determine user-specific social media trends/recommendations configured to improve the respective user's user-specific ranking(s)/score(s) and overall social media presence. This improves over the prior art at least because existing systems lack such predictive or classification functionality and are simply not capable of accurately analyzing aggregated social media data on a real-time basis to output a predictive result designed to improve a user's overall social media presence by increasing at least one score or ranking included within the user-specific ranking(s)/score(s).

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple such modules exist contemporaneously, communications may be achieved through signal transmission (e.g., over appropriate circuits and buses) that connect the modules. In some embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the one or more processors or processor-implemented modules may be located in a single geographic location (e.g., at a location of a mobile computing device or at a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Such memories may be or may include non-transitory, tangible computer-readable media configured to store computer-readable instructions that may be executed by one or more processors of one or more computer systems.

As used herein any reference to "one embodiment" or "an embodiment" means that a particular element, feature, structure, or characteristic described in connection with the embodiment is included in at least one embodiment. The appearances of the phrases "in one embodiment," "in an embodiment," "in some embodiments," or similar phrases in various places in the specification are not necessarily all referring to the same embodiment or the same set of embodiments.

Some embodiments may be described using the terms "coupled," "connected," "communicatively connected," or "communicatively coupled," along with their derivatives. These terms may refer to a direct physical connection or to an indirect (physical or communicative) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, which may include improving the functioning of conventional computers in performing tasks.

What is claimed is:

1. A virtual assistant device for enhancing media content and presence, comprising:
   one or more processors; and
   a memory communicatively coupled to the one or more processors, the memory containing instructions therein that, when executed, cause the one or more processors to:
      aggregate social media data from a plurality of agent profiles;
      determine a composite score corresponding to each respective agent profile by applying a media enhancement model to the social media data, wherein the media enhancement model is a trained machine learning model that evaluates a change in followers included in the social media data for a respective agent profile in accordance with a weighting algorithm to determine the composite score corresponding to each respective agent profile;
      partition, by the media enhancement model, the composite scores to correspond with one or more agent profile groups of a plurality of agent profile groups based upon satisfying a statistical distribution of the plurality of agent profile groups;
      catalog each respective agent profile into one of the one or more agent profile groups based upon the partitioning;
      determine one or more top media posts by applying the media enhancement model to the plurality of agent profile groups and the social media data;
      perform a semantic analysis on media posts in a respective posting history associated with the respective agent profile to determine a top media posts list for a respective agent;
      generate, by the media enhancement model, one or more curated tasks indicating one or more current trends configured to improve the composite score of the respective agent profile based upon the top media posts list, a respective agent profile group corresponding to the respective agent profile, and the social media data;
      determine, by the media enhancement model, an updated composite score based upon the completion of the one or more curated tasks;
      generate, by the media enhancement model, updated curated tasks to improve the updated composite score of the respective agent profile, based upon a change in engagement after the one or more curated tasks have been completed; and
      display (i) the top media posts list on a virtual social media board for viewing by all agents and (ii) the one or more curated tasks on a social media tasks panel for viewing by a respective agent associated with the respective agent profile.

2. The virtual assistant device of claim 1, wherein the instructions, when executed, further cause the one or more processors to:
   populate each respective agent profile with one or more curated social media tasks based upon the respective agent profile group corresponding to the respective agent profile.

3. The virtual assistant device of claim 1, wherein determining the one or more top media posts includes conducting, by the media enhancement model, a sentiment analysis on each media post associated with one or more top agent profiles.

4. The virtual assistant device of claim 1, wherein the instructions, when executed, further cause the one or more processors to:
   (a) designate the social media data as prior social media data;
   (b) aggregate current social media data from the plurality of agent profiles;
   (c) update the composite score corresponding to each respective agent profile by applying the media enhancement model to the current social media data;
   (d) catalog each respective agent profile into an agent profile group of the plurality of agent profile groups based upon the composite score corresponding to the respective agent profile;
   (e) determine one or more current top media posts by applying the media enhancement model to the plurality of agent profile groups and the current social media data;

(f) display the one or more current top media posts on the virtual social media board for viewing by the respective agent associated with each respective agent profile;

(g) designate the current social media data as the prior social media data; and (h) iteratively perform steps (b)-(h) at a predetermined frequency.

5. The virtual assistant device of claim 4, wherein the predetermined frequency is determined by the media enhancement model and is based upon the current social media data.

6. The virtual assistant device of claim 1, wherein the media enhancement model evaluates each of (i) an average number of likes included in the social media data for a respective agent profile, (ii) a number of followers included in the social media data for a respective agent profile, and (iii) a posting frequency included in the social media data for a respective agent profile, in accordance with a weighting algorithm to determine the composite score corresponding to each respective agent profile.

7. The virtual assistant device of claim 1, wherein the media enhancement model compares a number of likes corresponding to a media post associated with a top agent profile to an average number of likes associated with the top agent profile to determine the one or more top media posts.

8. The virtual assistant device of claim 1, wherein the media enhancement model is a machine learning model trained using a plurality of training agent profiles that each include a plurality of training social media data, and wherein the instructions, when executed, further cause the one or more processors to:

generate, via the media enhancement model, a social media strategy recommendation based upon real-time analysis of trending social media data from the social media data; and display the social media strategy recommendation to the respective agent in conjunction with an indication of a prioritized curated social media task from the one or more curated social media tasks based upon the social media strategy recommendation.

9. A computer-implemented method for enhancing media content and presence, comprising:

aggregating, by one or more processors, social media data from a plurality of agent profiles;

determining, by the one or more processors, a composite score corresponding to each respective agent profile by applying a media enhancement model to the social media data, wherein the media enhancement model is a trained machine learning model that evaluates a change in followers included in the social media data for a respective agent profile in accordance with a weighting algorithm to determine the composite score corresponding to each respective agent profile;

partitioning, by the one or more processors executing the media enhancement model, the composite scores to correspond with one or more agent profile groups of a plurality of agent profile groups based upon satisfying a statistical distribution of the plurality of agent profile groups;

cataloging, by the one or more processors, each respective agent profile into one of the one or more agent profile groups based upon partitioning;

determining, by the one or more processors, one or more top media posts by applying the media enhancement model to the plurality of agent profile groups and the social media data;

performing, by the one or more processors, a semantic analysis on media posts in a respective posting history associated with the respective agent profile to determine a top media posts list for a respective agent;

generating, by the one or more processors executing the media enhancement model, one or more curated tasks indicating one or more current trends configured to improve the composite score of the respective agent profile based upon the top media posts list, a respective agent profile group corresponding to the respective agent profile, and the social media data;

determining, by the media enhancement model, an updated composite score based upon the completion of the one or more curated tasks;

generating, by the media enhancement model, updated curated tasks to improve the updated composite score of the respective agent profile, based upon a change in engagement after the one or more curated tasks have been completed; and displaying, by the one or more processors, (i) top media posts list on a virtual social media board for viewing by all agents and (ii) the one or more curated tasks on a social media tasks panel for viewing by a respective agent associated with the respective agent profile.

10. The computer-implemented method of claim 9, further comprising:

populating, by the one or more processors, each respective agent profile with one or more curated social media tasks based upon the respective agent profile group corresponding to the respective agent profile.

11. The computer-implemented method of claim 9, wherein determining the one or more top media posts includes conducting, by the media enhancement model, a sentiment analysis on each media post associated with one or more top agent profiles.

12. The computer-implemented method of claim 9, further comprising:

(a) designating, by the one or more processors, the social media data as prior social media data;

(b) aggregating, by the one or more processors, current social media data from the plurality of agent profiles;

(c) updating, by the one or more processors, the composite score corresponding to each respective agent profile by applying the media enhancement model to the current social media data;

(d) cataloging, by the one or more processors, each respective agent profile into an agent profile group of the plurality of agent profile groups based upon the composite score corresponding to the respective agent profile;

(e) determining, by the one or more processors, one or more current top media posts by applying the media enhancement model to the plurality of agent profile groups and the current social media data;

(f) displaying, by the one or more processors, the one or more current top media posts on the virtual social media board for viewing by the respective agent associated with each respective agent profile;

(g) designating, by the one or more processors, the current social media data as the prior social media data; and (h) iteratively performing steps (b)-(h) at a predetermined frequency.

13. The computer-implemented method of claim 12, wherein the predetermined frequency is determined by the media enhancement model and is based upon the current social media data.

14. The computer-implemented method of claim 9, wherein the media enhancement model evaluates each of (i) an average number of likes included in the social media data for a respective agent profile, (ii) a number of followers included in the social media data for a respective agent profile, and (iii) a posting frequency included in the social media data for a respective agent profile, in accordance with a weighting algorithm to determine the composite score corresponding to each respective agent profile.

15. The computer-implemented method of claim 9, wherein the media enhancement model is a machine learning model trained using a plurality of training agent profiles that each include a plurality of training social media data, and wherein the method further comprises:

generating, by the one or more processors applying the media enhancement model, a social media strategy recommendation based upon real-time analysis of trending social media data from the social media data; and display the social media strategy recommendation to the respective agent in conjunction with an indication of a prioritized curated social media task from the one or more curated social media tasks based upon the social media strategy recommendation.

16. A non-transitory computer-readable storage medium comprising non-transitory computer-readable instructions stored thereon for enhancing media content and presence, wherein the instructions when executed on one or more processors cause the one or more processors to:

aggregate social media data from a plurality of agent profiles;

determine a composite score corresponding to each respective agent profile by applying a media enhancement model to the social media data, wherein the media enhancement model is a trained machine learning model that evaluates a change in followers included in the social media data for a respective agent profile in accordance with a weighting algorithm to determine the composite score corresponding to each respective agent profile;

partition, by the media enhancement model, the composite scores to correspond with one or more agent profile groups of a plurality of agent profile groups based upon satisfying a statistical distribution of the plurality of agent profile groups;

catalog each respective agent profile into one of the one or more agent profile groups based upon the partitioning;

determine one or more top media posts by applying the media enhancement model to the plurality of agent profile groups and the social media data;

perform a semantic analysis on media posts in a respective posting history associated with the respective agent profile to determine a top media posts list for a respective agent;

generate, by the media enhancement model, one or more curated tasks indicating one or more current trends configured to improve the composite score of the respective agent profile in real-time based upon the top media posts list, a respective agent profile group corresponding to the respective agent profile, and the social media data;

determine, by the media enhancement model, an updated composite score based upon the completion of the one or more curated tasks;

generate, by the media enhancement model, updated curated tasks to improve the updated composite score of the respective agent profile, based upon a change in engagement after the one or more curated tasks have been completed; and display (i) the top media posts list on a virtual social media board for viewing by all agents and (ii) the one or more curated tasks on a social media tasks panel for viewing by a respective agent associated with the respective agent profile.

17. The non-transitory computer-readable storage medium of claim 16, wherein the instructions, when executed, further cause the one or more processors to:

populate each respective agent profile with one or more curated social media tasks based upon the respective agent profile group corresponding to the respective agent profile.

18. The non-transitory computer-readable storage medium of claim 16, wherein determining the one or more top media posts includes conducting, by the media enhancement model, a sentiment analysis on each media post associated with one or more top agent profiles.

19. The non-transitory computer-readable storage medium of claim 16, wherein the instructions, when executed, further cause the one or more processors to:

(a) designate the social media data as prior social media data;

(b) aggregate current social media data from the plurality of agent profiles;

(c) update the composite score corresponding to each respective agent profile by applying the media enhancement model to the current social media data;

(d) catalog each respective agent profile into an agent profile group of the plurality of agent profile groups based upon the composite score corresponding to the respective agent profile;

(e) determine one or more current top media posts by applying the media enhancement model to the plurality of agent profile groups and the current social media data;

(f) display the one or more current top media posts on the virtual social media board for viewing by the respective agent associated with each respective agent profile;

(g) designate the current social media data as the prior social media data; and (h) iteratively perform steps (b)-(h) at a predetermined frequency determined by the media enhancement model.

20. The non-transitory computer-readable storage medium of claim 16, wherein the media enhancement model is a machine learning model trained using a plurality of training agent profiles that each include a plurality of training social media data, and wherein the instructions, when executed, further cause the one or more processors to:

generate, via the media enhancement model, a social media strategy recommendation based upon real-time analysis of trending social media data from the social media data; and display the social media strategy recommendation to the respective agent in conjunction with an indication of a prioritized curated social media task from the one or more curated social media tasks based upon the social media strategy recommendation.

* * * * *